United States Patent
Kirazci et al.

(10) Patent No.: US 9,558,248 B2
(45) Date of Patent: Jan. 31, 2017

(54) UNIFIED SEARCHABLE STORAGE FOR RESOURCE-CONSTRAINED AND OTHER DEVICES

(71) Applicant: Google Inc., Mountain View, CA (US)

(72) Inventors: Ulas Kirazci, Mountain View, CA (US); Brendan D. Burns, Seattle, WA (US); Abhishek Das, San Francisco, CA (US); Ankit Jain, Milpitas, CA (US); Anna Patterson, Saratoga, CA (US)

(73) Assignee: Google Inc., Mountain View, CA (US)

( * ) Notice: Subject to any disclaimer, the term of this patent is extended or adjusted under 35 U.S.C. 154(b) by 143 days.

(21) Appl. No.: 13/971,240

(22) Filed: Aug. 20, 2013

(65) Prior Publication Data

US 2014/0201195 A1 Jul. 17, 2014

Related U.S. Application Data

(60) Provisional application No. 61/753,152, filed on Jan. 16, 2013.

(51) Int. Cl.
*G06F 17/30* (2006.01)

(52) U.S. Cl.
CPC ... *G06F 17/30554* (2013.01); *G06F 17/30613* (2013.01)

(58) Field of Classification Search
CPC combination set(s) only.
See application file for complete search history.

(56) References Cited

U.S. PATENT DOCUMENTS

| | | | |
|---|---|---|---|
| 7,007,015 B1 | 2/2006 | Nayak | |
| 7,308,462 B1* | 12/2007 | Clarkson | H04M 3/4872 |
| 7,555,757 B2 | 6/2009 | Smith et al. | |
| 7,685,145 B2* | 3/2010 | Bruno | G06F 17/30312 |
| | | | 707/999.101 |
| 7,743,064 B2* | 6/2010 | Faulkner et al. | 707/758 |
| 8,046,220 B2 | 10/2011 | Agarwal et al. | |
| 8,370,849 B2 | 2/2013 | Cheenath et al. | |
| 2004/0100960 A1* | 5/2004 | Mehta | H04L 45/00 |
| | | | 370/392 |
| 2005/0106653 A1 | 5/2005 | Tennagels et al. | |
| 2006/0294049 A1* | 12/2006 | Sechrest | G06F 9/4843 |
| 2007/0016570 A1 | 1/2007 | Punaganti et al. | |
| 2007/0078803 A1* | 4/2007 | Gilmour et al. | 707/1 |
| 2007/0220498 A1* | 9/2007 | Madsen | G06F 9/445 |
| | | | 717/140 |
| 2008/0033954 A1 | 2/2008 | Brooks et al. | |

(Continued)

OTHER PUBLICATIONS

Anaxial et al., "Flash memory," Wikipedia, the free encyclopedia, Jan. 15, 2013, Retrieved from the Internet: URL:http://en.wikipedia.org/w/index.php?title=Flash_memory&oldid=533251755, [retrieved on Jun. 24, 2014] p. 13: section "Flash memory as a replacement for hard drives", 19 pages.

(Continued)

*Primary Examiner* — Etienne Leroux
(74) *Attorney, Agent, or Firm* — Fish & Richardson P.C.

(57) ABSTRACT

The present disclosure describes a data indexing and search service that resides locally on a computing device (e.g., a mobile phone) and that can host data for multiple applications on the device. By centralizing the storage of data as well as the search and query functions, unified search queries can be performed by the service.

18 Claims, 3 Drawing Sheets

(56) References Cited

U.S. PATENT DOCUMENTS

| | | | |
|---|---|---|---|
| 2011/0145581 A1* | 6/2011 | Malhotra et al. | 713/171 |
| 2012/0271820 A1 | 10/2012 | Serdy et al. | |
| 2013/0205001 A1* | 8/2013 | Reed | G06F 9/44505 709/224 |
| 2013/0212099 A1* | 8/2013 | Dellinger | G06F 17/3064 707/731 |
| 2014/0222824 A1* | 8/2014 | Joshi | G06F 17/30321 707/741 |

OTHER PUBLICATIONS

Navarro et al., "Modern Information Retrieval, Chapter 8: Indexing and Searching," 1999, Modern Information Retrieval, ACM Press, New York, pp. 191-228, section 8.2: "Inverted Files".

International Search Report and Written Opinion in International Application No. PCT/US2013/073563, mailed Jul. 2, 2014, 13 pages.

International Preliminary Report on Patentability in International Application No. PCT/US2013/073563, mailed Jul. 30, 2015, 9 pages.

* cited by examiner

UNIFIED SEARCHABLE STORAGE FOR RESOURCE-CONSTRAINED AND OTHER DEVICES

CROSS-REFERENCE TO RELATED APPLICATION

This application claims the benefit of U.S. Provisional Application Ser. No. 61/753,152, filed on Jan. 16, 2013, which is incorporated by reference.

FIELD OF THE DISCLOSURE

The present disclosure relates to unified searchable storage for resource constrained devices.

BACKGROUND

Search programs can allow a user to perform text searches, for example, of a user's e-mail, computer files, music, photos, chats and Web pages viewed. When initially installed on a device (e.g., a desktop personal computer), the software program can index the files in the computer. After initial indexing is completed, the software may continue to index files as needed. The indexed files then can be searched by a user, and results can be returned, for example, in a web browser.

Some devices that store various types of files that a user may wish to search are resource-constrained in the sense that the devices may have, for example, a relatively slow central processing unit (CPU), limited random access memory (RAM) and/or limited disk storage. In such resource-constrained environments, updating the storage and index can be inefficient, resulting in high background CPU usage and too much disk activity. As a result, some solutions do not scale easily to the desirable amount of data to be stored and searched. The lack of scalability can make it difficult, if not impossible, to include features such as fast unified searching and unified keyword and entity suggestions that span across multiple applications and databases.

SUMMARY

The present disclosure describes a data indexing and search service that resides locally on a device (e.g., a mobile phone) and that can host data for multiple applications on the device. By centralizing the storage of data as well as the search and query functions, unified search queries can be performed by the service without the need, in some cases, to start up multiple applications and open multiple databases.

For example, according to one aspect, a computing device includes a user-interface including a search box and applications residing in the computing device, wherein each application includes a respective content provider. The computing device an index manager, a data indexing and search service residing in the computing device and providing an entry point to the index manager, and disk-backed storage (e.g., flash storage). The data indexing and search service is operable to obtain data from the content providers associated with respective ones of the applications. The index manager indexes the data from the content providers, and stores the indexed data in the disk-backed storage. The data index manager includes a query processor to handle execution of search queries received from the search box and received from any of the applications. The query processor handles execution of the search queries by searching the indexed data stored in the disk-backed storage and returning results based on the searching.

Various implementations include one or more of the following features. For example, in some implementations, in response to receiving a search query from a particular one of the applications, the data indexing and search service returns result only with respect to a corpus associated with the particular one of the applications. On the other hand, in response to receiving a search query from the search box, the data indexing and search service can return results with respect to all corpora associated with the applications or with respect to a subset of the corpora.

In some implementations, the disk-backed storage stores a first index having a lexicon that maps terms contained in documents from a particular application to term identifiers, and a second index having a lexicon that maps terms to term identifiers and an offset into an index file. Indexing of the data can take place, for example, in the first index, which periodically can be merged into the second index. The lexicons can be implemented, for example, as file-backed tries.

In some cases, the indexing and search service performs indexing of data from a particular one of the applications in response to a request from the particular application to register with the indexing and search service. The indexing and search service also may perform indexing of data from a particular one of the applications in response to a request for indexing by the particular application.

In another aspect, a method of indexing and searching data on a computing device is described. For example, in some implementations, the method includes binding a first application residing on the computing device to an indexing and search service residing on the computing device, and registering a corpus and a content provider, associated with the first application, with the indexing and search service. Data from files associated with the first application are indexed by the indexing and search service, and the indexed data is stored in disk-backed storage on the device. The indexing and search service then can be used to execute a search query from the first application. A similar process can be performed with respect to other applications residing on the computing device.

Some implementations include one or more of the following advantages. For example, storing all application indices in one place (i.e., in the same disk-backed flash storage) can facilitate faster universal searches. Furthermore, the disk-backed storage can be scalable and can provide, for example, statistics for predictive applications. The data indexing and search service can execute searches relatively quickly, and can use compressed storage with a relatively small footprint. The service can reduce the number of flash writes required and can allow write operations to include a greater amount of data (e.g., through the use of batching).

Other aspects, features and advantages will be apparent from the following detailed description, the accompanying drawings and the claims.

DETAILED DESCRIPTION

The present disclosure describes a data indexing and search service that resides locally on a device (e.g., a mobile phone) and that hosts the data for multiple applications on the device. The data indexing and service can provide an efficient, centralized on-device (offline) search and document store service, and can provide an open application programming interface (API) to the other applications on the device. The techniques can facilitate searching all corpora (or a subset of corpora) in the device, and can facilitate keyword suggestions across all corpora (or a subset of corpora). In addition, a privacy model is described to ensure that data (e.g., suggestions and search results) from one corpus does not appear in searches intended for another corpus.

The techniques described here can be implemented, for example, on various types of resource-constrained devices, including handheld computing devices, such as mobile phones, tablets and personal digital assistants (PDAs). The techniques also can be implemented on other computing devices, such as desktop personal computers, laptop computers.

Figure 1:
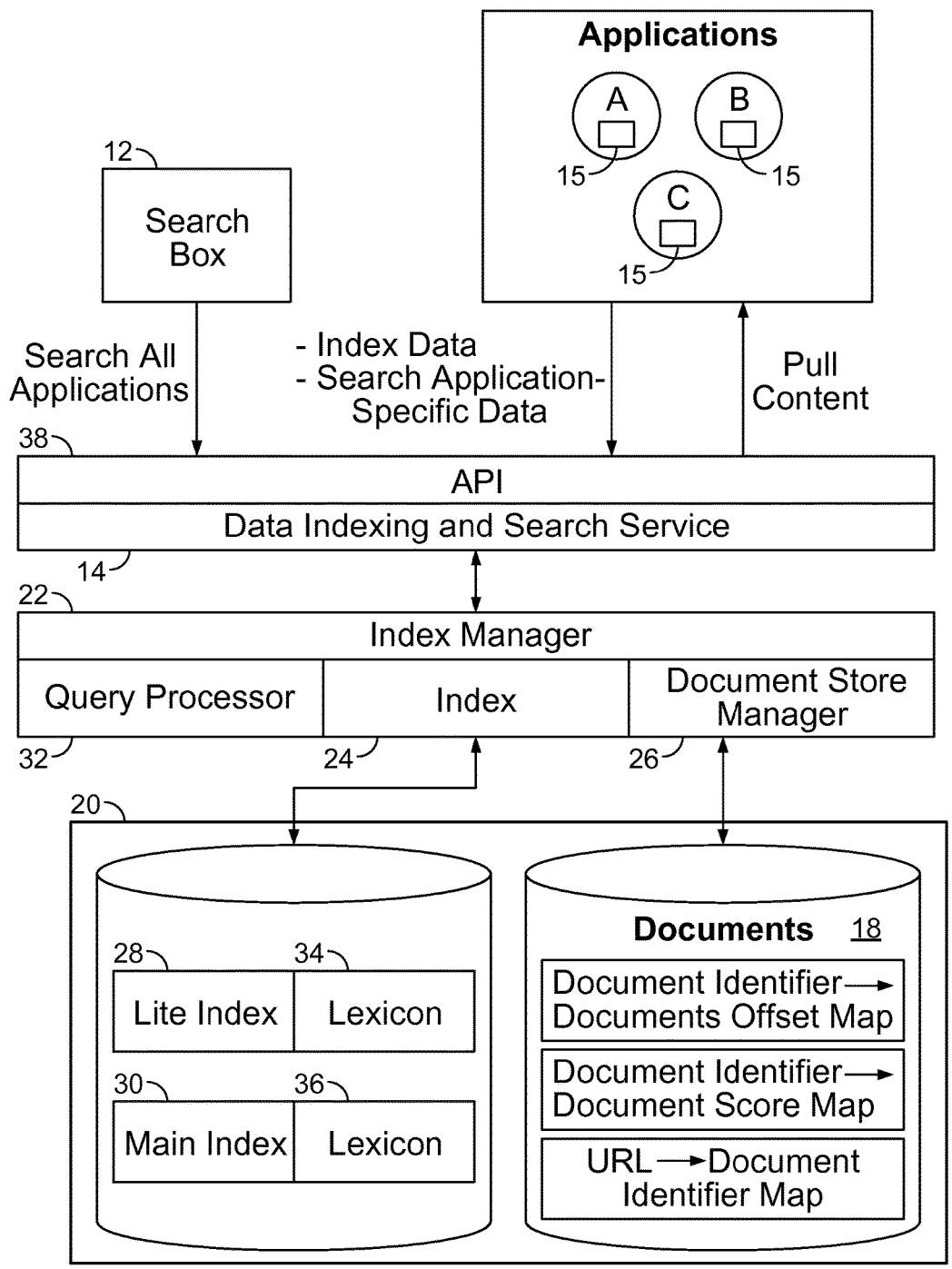
FIG. 1 illustrates an example of a computing device that includes an on-device data indexing and search service.

As illustrated in FIG. 1, a computing device (e.g., a mobile phone) has a graphical user-interface including a search box 12 in which a user of the device can enter a search term. The device also stores one or more applications (e.g., applications A, B and C) that may be executed on the device. An example of such an application is an e-mail application residing on the device. A data indexing and search service 14 pulls data (e.g., documents) from respective client content providers 15 associated with each application A, B, C, stores the data in a respective corpus 18 and indexes it. Corpora 18 can be stored, for example, in files in flash storage 20 on the computing device.

Indexing and search service 14 serves as an entry point to an index manager 22, which implements a binder API 38, handles content synchronizations from the client applications, and encapsulates a thread where background processing takes place. Index manager 22 includes a document storage manager 26 that manages corpora 18 and a query processor 32 that handles the execution of search queries received from search box 12 or from one of the client applications A, B, C. When an application needs to obtain results of a search query, the application delegates the search to service 14 rather than performing the search itself.

Flash storage 20 also stores a lite index 28 and a main index 30. Lite index 28 can be updated on an ongoing basis and has a lexicon 34 that maps terms contained in the documents to term identifiers. Main index 30 serves as permanent index that stores the rest of the index. Lite index 28 can be merged periodically into permanent index 30, which has a lexicon 36 that maps terms to term identifiers and an offset into an index file. The lexicons 34, 36, indices 28, 30 and corpora 18 can be stored in separate files in disk-backed storage 20. The lexicons can be implemented, for example, as file-backed tries that are initialized by a disk read.

Figure 2:
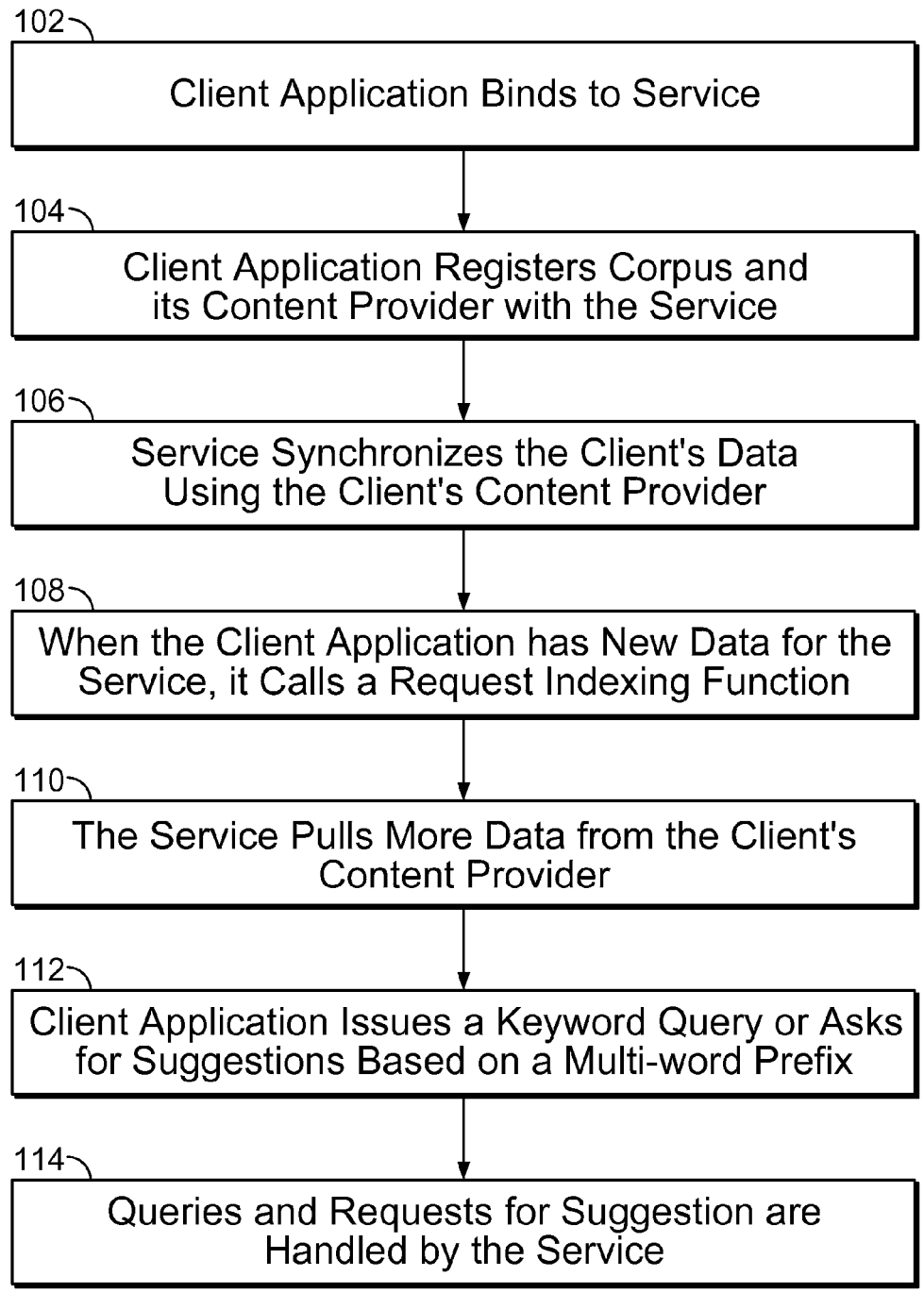
FIG. 2 is a flow chart illustrating an example of using the data indexing and search service.

To interface with service 14, an application A, B, C binds to and calls the service's Interface Definition Language Application Programming Interface ("IDL API") 38. Service 14 then uses the content provider 15 in the application A, B, C to synchronize the application's data to its own store 20. A document can be referred to by a Uniform Resource Identifier (URI), which can be an arbitrary string determined by the client application. FIG. 2 illustrates further details according to a particular implementation discussed in the following paragraphs.

Initially a client application A, B, C binds to service 14 (block 102). The client application then calls a Grant URI Permission function with respect to a corpus content provider 15 and registers the corpus and content provider with service 14 using a Registration function (block 104). When a client application registers with service 14, the client application provides an address for an API from which the service 14 can pull the content. Service 14 then synchronizes the client's data using the client's content provider 15 (block 106). Further details of the synchronization process are described below. When the client application has new data for service 14, it calls a Request Indexing function (block 108), which causes service 14 to pull more data from the client's content provider 15 (block 110). As described below, a client application A, B, C can issue a keyword query or ask for suggestions based on a multi-word prefix (block 112). The queries and requests for suggestion are handled by service 14 (block 114).

Details of the synchronization process, which is the mechanism by which service 14 inserts documents from other applications A, B, C and makes them searchable, is described next. In some implementations, service 14 synchronizes documents and tags, which are properties of a document. A client application can dynamically change attributes of a document provided to service 14 and, as discussed below, a user can limit a search query to documents having specified features. As mentioned above, documents can be uniquely referred to by an opaque string URI and can contain sections, which also can be indexed. For example, for an e-mail application, a document may be a single message, and its sections can include "From," "To," "Subject," and "Body" lines. Such a document can include, for example, the following tags: "Inbox," "Unread," or "Sent." In some implementations, the total data in the document may not exceed a predetermined amount. For data that exceeds this length, sections of the document may be truncated, starting, for example, with the longest section in that document. Synchronization data is a table keyed by a monotonically increasing action sequence number. Service 14 then applies those actions in that order. The respective content provider 15 returns the sequence numbers (e.g., arrival timestamps) in monotonically increasing order.

A client application A, B, C can use a Get Corpus Status function to gain visibility into the processing of its data by service 14. For example, for any data that is committed, the client application can safely assume that service 14 will not ask for that data again. However, if the user deletes the service's data, the client application would need to re-register, in which case service 14 will request the data anew. A client application A, B, C can unregister a corpus, which makes the data no longer accessible; the data eventually is wiped from flash storage 20.

The following paragraphs explain how indexing and searching can be performed by service 14. Indexing can be triggered either by registering a corpus, for example, when an application A, B or C first requests to use data indexing and searching service 14, or by requesting indexing. The tasks of polling application content providers, writing data to flash storage 20 and indexing occurs in a background thread. When registering a new corpus 18, indexing by service 14 commences immediately. When service 14 receives an indexing request with respect to an existing corpus 18, service 14 can delay indexing (e.g., by one second) in anticipation of receiving additional indexing requests.

In some implementations, indexing takes place in batches of up to twenty documents or one hundred tags representing properties of documents. The application's content provider is requested to return at most this many documents for a given query. After this batch is indexed, another indexing task can be rescheduled on the thread immediately. The goal is to reduce large queries to the application's content provider and to allow for fairness among corpora 18 that need indexing. Indexing can be performed to completion (i.e., until no documents from any of the corpora 18 remain to be indexed).

As mentioned above, document storage manager 26 manages corpora 18. Each document from one of the applications A, B, C to be stored and indexed in a corresponding corpus 18 is compressed and appended to the file. Deletions and tags (i.e., document properties) can be marked in bitmaps indexed by document identifiers. The file also maintains a mapping from the corpus and URI to the document identifier.

Term identifier—document identifier pairs that indicate documents containing a particular term are appended into buffers in lite index 28 and main index 30. Indices 28, 30 then can return all terms matching a specified prefix or can return a list of document identifiers indexed under a specified term in response to a suggest or search query.

Index files 28, 30 can store posting lists. For example, in some implementations, each block maintains a free list of byte arrays for posting lists, which can be in blocks of flash page size (e.g., 4K-8K). Posting lists can be strictly ordered, for example, from the most recent document down (the default search result sort order) and contain "hits" (e.g., document identifiers) indicating documents that contain a specified term. In some implementations, posting list byte arrays are allocated in fixed sizes, roughly in powers of two, up to 1,000 hits, with each hit containing four bytes. If a term has more than 1,000 hits, the blocks are chained in a single linked list.

In some implementations, a query is specified in free form and may have a maximum permissible length. Special operators supported by some implementations include the following:

| Operator | Description |
| --- | --- |
| [-]tag:<tagname> | Return only documents that contain the tag <tagname>. Optionally preceded by a minus, which means return only documents that do NOT contain that tag. |
| <section-name>:<term> | Look for <term> only in section <section-name>. The application of the section stops at whitespace, as opposed to all tokenizer boundaries. For example, "section1:a-b-c" will result in an AND of section1:a, section1:b and section1:c. |

Figure 3:
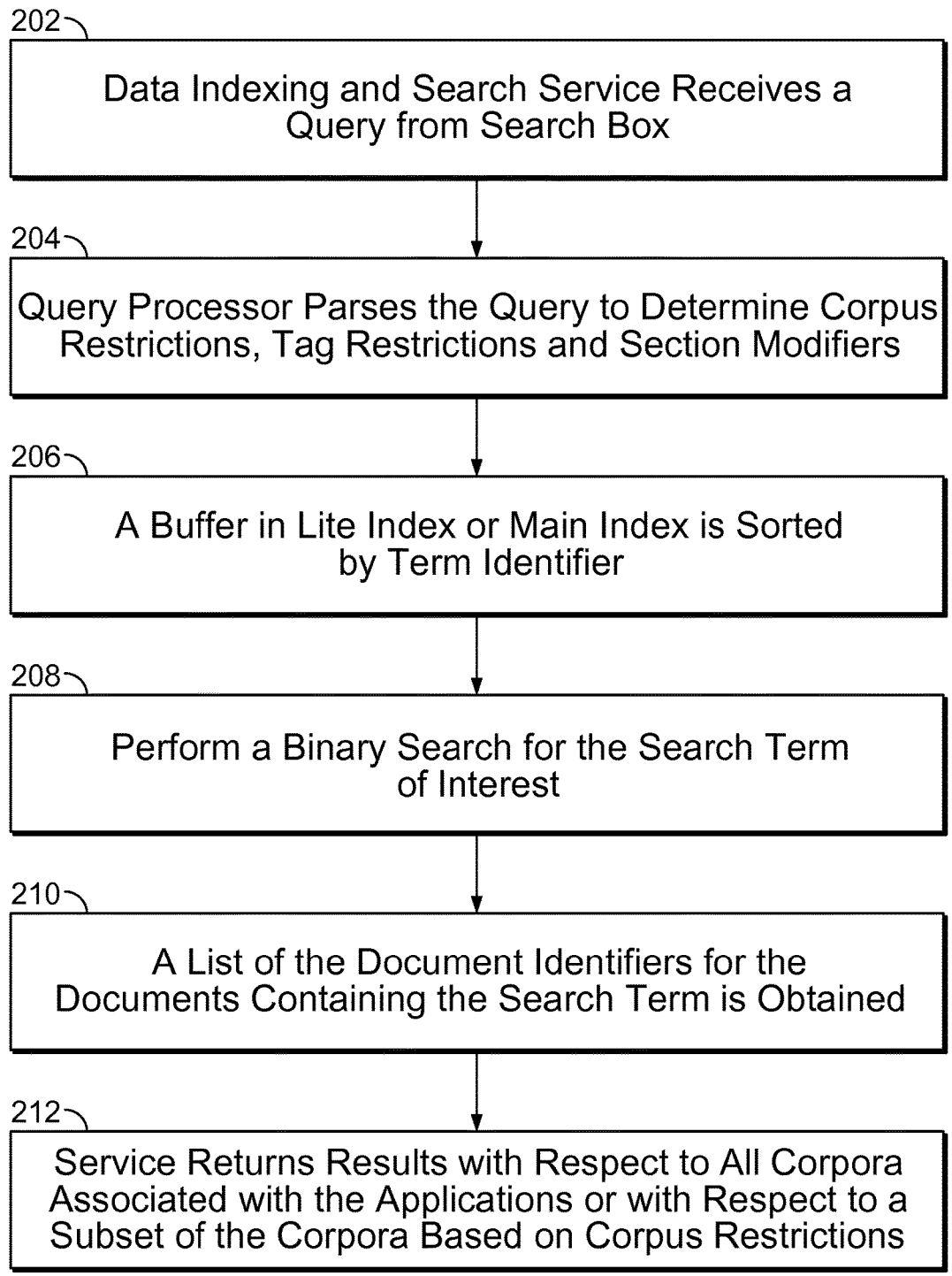
FIG. 3 is a flow chart illustrating another example of using the data indexing and search service.

Search and suggest queries arrive through binder API 38 and are executed in-line. As indicated by FIG. 3, when service 14 receives a query from search box 12 (block 202), query processor 32 parses the query (block 204) to determine corpus restrictions, tag restrictions and section modifiers (e.g., the "To" line or he "Subject" line in an e-mail message). When a query is received in service 14, a buffer in one of lite index 28 or main index 30 can be sorted by term identifier (block 206). Then a binary search for the term of interest is performed (block 208), and a list of the document identifiers for the documents containing the search term is obtained (block 210). For search queries from search box 12, service 14 can return results with respect to all corpora associated with the applications or with respect to a subset of the corpora (block 212).

In some implementations, query processor 32 looks up the terms in both lite index 28 and main index 30, retrieves a certain portion of document identifiers (up to a parameter "num_to_score") document identifiers from both indices, and in the case of multiple term searches, obtains the intersection (or union) of the posting lists. Query processor 32 can look up a document score array (i.e., a score dictated by each application such as the date of the document) to map each document identifier to its score and computes the top document identifiers by score. These document identifiers are used to look up content corresponding to the document identifiers. A part of the document content is returned for each document based on query parameters. For subsequent queries, if new documents are indexed, then new terms that were added, for example, to the lite index 28 can be sorted separately and then combined with a previously-sorted list.

To manage the disk-backed flash storage 20, storage 20 is accessed through index 24. New documents can be appended immediately to document store as they are added. The newly added documents then are indexed. Although the index and lexicon have two segments (i.e., main and lite), indexing takes place in lite index 28. During indexing, all lexicon and index changes are written to lite index 28 until a flush function is called. Index hits are accumulated in a file, but no explicit disk sync occurs until the flush function is called, which merges lite index 28 into main index 30, erases lite index 28 and calls a fsync function for the main index 30 to commit the buffered data. The flush function can be scheduled when lite index limits are reached or when a timer expires (e.g., once a day).

As noted above, when a search query is received, query processor 32 searches both lite index 28 and main index 30. During a flush operation, a lock prevents searches from traversing partially written data; thus, no searches can take place during the flush operation. In some implementations, a flush operation takes 2-10 seconds, and about six hundred e-mail messages can be buffered in lite index 28 before a flush operation is required.

Periodically (e.g., once a week) or when there is no available disk space, a compaction process is performed to create new copies of the corpus files 18, index files 28, 30 and lexicon files 34, 36. All deleted document identifiers are erased, the document identifier space is re-compacted, and a new index is written based on the new document identifiers. The document identifiers are re-ordered by highest scoring first. A new lexicon points to the posting list locations in the new index. After the compaction is completed, a fsync function is called with respect to all files. The new files are then used. No indexing occurs during compaction, but searches can proceed using the old index.

Preferably, data integrity is preserved without resorting to frequent, costly calls to the disk sync function. To achieve this goal, the following properties is used in some implementations. First, the index is like a cache; it contains no irrecoverable data, and all data can be re-created from corpus 18 or, if necessary, re-synced from the content source (e.g., the content provider associated with application A, B or C). Second, a solution that has higher costs of recovery for unlikely scenarios, but much lower average resource usage (e.g., disk writes) for the common cases, is preferred. For this purpose, data can be split conceptually into "ground truth" data and recoverable data. If ground truth data is lost, it needs to be recovered from the content source (i.e., the client application content provider), which tends to be costly. On the other hand, recoverable data can be reconstructed from ground truth data. Ground truth data can include, for example, document store, document identifier mapper (maps a document identifier to an offset in the document store), and tag bitmaps. Recoverable data can include, for example, a URI map that maps a URI to a document identifier, a document score table that maps a document identifier to a document store, as well as index, lexicon and term properties. Ground truth data is append-only. Therefore, flushed ground truth data cannot be corrupted by power loss.

The lite index 28 and lexicon 34 can use read/write MAP_SHARED file-backed data structures that include updating cyclic redundancy checks (CRCs). For example, each random-write array can be protected by a CRC. When the file-backed data structure receives an onSleep callback, it updates its CRC. Two strategies can be used to update the CRC. First, a small number of random updates can be buffered and used to compute an incremental CRC, whereas large numbers of updates can be clear the buffer and fall back on a complete CRC re-computation. Upon startup, consistency can be checked against the CRCs to ensure that inconsistent data is not loaded and used.

The main index 30 and lexicon 36 can use MAP_PRIVATE read-only file-backed data that does not modify the file data between flushes. Therefore the main index 30 and lexicon 36 are immune to file corruption between flushes. During a flush, an in_flushing bit is synchronized to flash storage 20, the flush is completed, and then the bit is unset and main index 30 is re-synchronized to flash storage 20. Upon startup, if the in_flushing bit is set, the system assumes that the files are corrupted and re-constructs them from the ground truth data.

Consistency can be coordinated between index manager 22, which synchronizes content with client applications A, B and C, and index implementation. For example, upon initialization, index manager 22 passes down the last flush status to index 24. The flush status contains the last flushed (i.e., committed) document store size. Index 24 responds with an indication of how much content it was able to successfully recover since the last flush point and responds with the per-corpus last sequence number it has seen in the recovered region. Index manager 22 resets its last sequence number for each corpus 18 to the last flushed sequence number plus any recovered sequence numbers from index 24. After this document store initialization is complete, the index is initialized. If lite index 28 is corrupted, documents seen since the last flush are re-indexed. If main index 30 is corrupted, the entire index is rebuilt.

Any data structures touched both by searching time and indexing time can be protected by locks. For example, in some implementations, data indexing and search service 14 remains active as long as a client application A, B, C is bound to it or the background thread has work to perform. When service 14 is inactive, index manager 22 receives an "onSleep" event to cache service 14. In some situations, the framework (i.e., the device's operating system) may decide that there is memory pressure and stop the process (as well as the index manager) at any time. However, by caching service 14, the data and code can be readily available in case the user wants to execute back-to-back queries.

The service also creates a periodic maintenance alarm that runs, for example, every day at 2:00 a.m. local time. If, for example, the device's battery is low (ACTION_BATTERY_LOW), the maintenance alarm is retried every hour until it succeeds. In some cases, the maintenance executes the flush function (i.e., disk commit) every day and a compaction either every week or when the free space is less than a predetermined amount (e.g., 10%) of the allowed space.

By centralizing the storage of data as well as the search and query functions, unified search queries can be performed by service 14 without the need to start up multiple applications and open multiple databases. Storing all application indices in one place can facilitate faster universal searches. In some cases, fast, relevancy-scored suggestions from the entire lexicon can be provided. Furthermore, storage 20 can be scalable and can serve, for example, statistics for predictive applications. Data indexing and search service 14 can execute searches relatively quickly, and uses compressed storage with a relatively small footprint. The service 14 can reduces the number of flash writes required and can allow write operations to include a greater amount of data (e.g., through the use of batching). Service 14 can fetch a document by using the document's URI. Also, in the illustrated implementation, service 14 does not have a durable write interface; thus, service 14 decides when to commit data, not client applications.

To ensure that data (e.g., suggestions and search results) from one corpus does not appear in searches intended for another corpus, each application A, B, C is permitted to have a search performed only on its own corpus. In contrast, a search query entered into search box 12 can be executed with respect to all corpora (or a specified sub-set of corpora).

Various aspects of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone or other computing device. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the invention. Accordingly, other implementations are within the scope of the claims.

What is claimed is:

1. A method, comprising:
    storing, in a memory of a mobile computing device, multiple applications;
    obtaining, by a data indexing and search service executing on the mobile computing device, data from one or more content providers that are associated with a respective application of the multiple applications stored in the memory of the mobile computing device;
    storing, by the data indexing and search service executing on the mobile computing device, the obtained data in an index residing in the memory of the mobile device;
    receiving, by the data indexing and search service executing on the mobile computing device, a search query from either (i) a unified search box, or (ii) a particular application of the multiple applications;
    determining whether the search query was received from (i) the unified search box, or (ii) a particular application of the multiple applications;
    in response to determining that the search query was received from the unified search box, searching multiple corpora in the index residing in the memory of the mobile device, wherein each corpora of the multiple corpora are each associated with a particular application of the multiple applications, and generating a set of search results based on the searching of the multiple corpora;
    in response to determining that the search query was received from the particular application of the multiple application, searching only the corpora in the index residing in the memory of the mobile device that is associated with the particular application, and generating a set of search results based on the searching of only the corpora that is associated with the particular application; and
    providing, by the mobile computing device, the generated set of search results for display on a graphical user interface of the mobile computing device.

2. The method of claim 1, wherein the set of search results generated based on the searching of the multiple corpora includes results with respect to all corpora associated with the applications.

3. The method of claim 1, wherein storing, by the data indexing and search service executing on the mobile computing device, the obtained data in an index residing in the memory of the mobile device includes:
    storing the obtained data in a first index having a lexicon that maps terms contained in documents from a particular application to term identifiers.

4. The method of claim 3, the method further comprising:
    periodically merging the first index into a second index, wherein the second index includes a lexicon that maps terms to term identifiers and an offset into an index file.

5. The method of claim 4, wherein the lexicons are implemented as file-backed tries.

6. The method of claim 1, the method further comprising:
    parsing the search query received to determine at least one of corpus restrictions, tag restrictions or section modifiers.

7. A system, comprising:
    one or more computers and one or more storage devices storing instructions that are operable, when executed by the one or more computers, to cause the one or more computers to perform operations comprising:
        storing, in a memory of a mobile computing device, multiple applications;

obtaining, by a data indexing and search service executing on the mobile computing device, data from one or more content providers that are associated with a respective application of the multiple applications stored in the memory of the mobile computing device;

storing, by the data indexing and search service executing on the mobile computing device, the obtained data in an index residing in the memory of the mobile device;

receiving, by the data indexing and search service executing on the mobile computing device, a search query from either (i) a unified search box, or (ii) a particular application of the multiple applications;

determining whether the search query was received from (i) the unified search box, or (ii) a particular application of the multiple applications;

in response to determining that the search query was received from the unified search box, searching multiple corpora in the index residing in the memory of the mobile device, wherein each corpora of the multiple corpora are each associated with a particular application of the multiple applications, and generating a set of search results based on the searching of the multiple corpora;

in response to determining that the search query was received from the particular application of the multiple application, searching only the corpora in the index residing in the memory of the mobile device that is associated with the particular application, and generating a set of search results based on the searching of only the corpora that is associated with the particular application; and providing, by the mobile computing device, the generated set of search results for display on a graphical user interface of the mobile computing device.

8. The system of claim 7, wherein the set of search results generated based on the searching of the multiple corpora includes results with respect to all corpora associated with the applications.

9. The system of claim 7, wherein storing, by the data indexing and search service executing on the mobile computing device, the obtained data in an index residing in the memory of the mobile device includes:

storing the obtained data in a first index having a lexicon that maps terms contained in documents from a particular application to term identifiers.

10. The system of claim 9, the operations further comprising:

periodically merging the first index into a second index, wherein the second index includes a lexicon that maps terms to term identifiers and an offset into an index file.

11. The system of claim 10, wherein the lexicons are implemented as file-backed tries.

12. The system of claim 7, the operations further comprising:

parsing the search query received to determine at least one of corpus restrictions, tag restrictions or section modifiers.

13. A non-transitory computer-readable medium storing software comprising instructions executable by one or more computers which, upon such execution, cause the one or more computers to perform operations comprising:

storing, in a memory of a mobile computing device, multiple applications;

obtaining, by a data indexing and search service executing on the mobile computing device, data from one or more content providers that are associated with a respective application of the multiple applications stored in the memory of the mobile computing device;

storing, by the data indexing and search service executing on the mobile computing device, the obtained data in an index residing in the memory of the mobile device;

receiving, by the data indexing and search service executing on the mobile computing device, a search query from either (i) a unified search box, or (ii) a particular application of the multiple applications;

determining whether the search query was received from (i) the unified search box, or (ii) a particular application of the multiple applications;

in response to determining that the search query was received from the unified search box, searching multiple corpora in the index residing in the memory of the mobile device, wherein each corpora of the multiple corpora are each associated with a particular application of the multiple applications, and generating a set of search results based on the searching of the multiple corpora;

in response to determining that the search query was received from the particular application of the multiple application, searching only the corpora in the index residing in the memory of the mobile device that is associated with the particular application, and generating a set of search results based on the searching of only the corpora that is associated with the particular application; and providing, by the mobile computing device, the generated set of search results for display on a graphical user interface of the mobile computing device.

14. The computer-readable medium of claim 13, wherein the set of search results generated based on the searching of the multiple corpora includes results with respect to all corpora associated with the applications.

15. The computer-readable medium of claim 13, wherein storing, by the data indexing and search service executing on the mobile computing device, the obtained data in an index residing in the memory of the mobile device includes:

storing the obtained data in a first index having a lexicon that maps terms contained in documents from a particular application to term identifiers.

16. The computer-readable medium of claim 15, the operations further comprising:

periodically merging the first index into a second index, wherein the second index includes a lexicon that maps terms to term identifiers and an offset into an index file.

17. The computer-readable medium of claim 16, wherein the lexicons are implemented as file-backed tries.

18. The computer-readable medium of claim 13, the operations further comprising:

parsing the search query received to determine at least one of corpus restrictions, tag restrictions or section modifiers.

* * * * *